(12) United States Patent
Love et al.

(10) Patent No.: US 8,387,130 B2
(45) Date of Patent: Feb. 26, 2013

(54) AUTHENTICATED SERVICE VIRTUALIZATION

(75) Inventors: Philip C. Love, Alhambra, CA (US); Srinivas Mandayam Aji, Bangalore (IN); Zhaohui Guo, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 838 days.

(21) Appl. No.: 12/001,149

(22) Filed: Dec. 10, 2007

(65) Prior Publication Data

US 2009/0150988 A1 Jun. 11, 2009

(51) Int. Cl.
*H04L 9/32* (2006.01)
(52) U.S. Cl. .............. 726/15; 726/5; 726/7; 726/10; 713/153; 713/156; 713/175
(58) Field of Classification Search ............... 726/15
See application file for complete search history.

(56) References Cited

U.S. PATENT DOCUMENTS

| | | | | |
|---|---|---|---|---|
| 5,684,950 A * | 11/1997 | Dare et al. | | 726/10 |
| 6,401,211 B1 * | 6/2002 | Brezak et al. | | 726/5 |
| 6,427,209 B1 * | 7/2002 | Brezak et al. | | 726/10 |
| 7,577,834 B1 * | 8/2009 | Traversat et al. | | 713/156 |
| 2003/0188193 A1 * | 10/2003 | Venkataramappa | | 713/201 |
| 2004/0093519 A1 * | 5/2004 | Grobman | | 713/201 |
| 2004/0128392 A1 * | 7/2004 | Blakley et al. | | 709/229 |
| 2006/0137001 A1 * | 6/2006 | Foster et al. | | 726/10 |
| 2007/0199056 A1 * | 8/2007 | Bhatia et al. | | 726/8 |
| 2007/0256118 A1 * | 11/2007 | Nomura et al. | | 726/3 |
| 2007/0277231 A1 * | 11/2007 | Medvinsky et al. | | 726/5 |
| 2008/0134311 A1 * | 6/2008 | Medvinsky et al. | | 726/7 |
| 2010/0242102 A1 * | 9/2010 | Cross et al. | | 726/7 |

FOREIGN PATENT DOCUMENTS

CN 1882109 A 12/2006

OTHER PUBLICATIONS

Kerberos (protocol), May 12, 2007, http://en.wikipedia.org/wiki/Kerberos (*protocol*).
Brian Tung, The Moron's Guide to Kerberos, Version 2.0, Jan. 2, 2007, http://www.isi.edu/~brian/security/kerberos.html.
John Brezak, Windows 200 and Kerberos Tickets, Utilizing the Windows 2000 Authorization Data in Kerberos Ticket for Access Control to Resources, Feb. 2002, http://msdn2.microsoft.com/en-us/library/aa302203.aspx.

* cited by examiner

*Primary Examiner* — Kambiz Zand
*Assistant Examiner* — Yonas Bayou
(74) *Attorney, Agent, or Firm* — Van Pelt, Yi & James LLP

(57) ABSTRACT

Virtualizing a service is disclosed. A request to access a service from a first server is received from a client. A secret data associated with the first server is used to process the received request. The processed request is sent to a second server. The first and second servers are associated with a virtualization; and wherein the processed request can be used by the second server to authenticate the client.

16 Claims, 5 Drawing Sheets

US 8,387,130 B2

AUTHENTICATED SERVICE VIRTUALIZATION

BACKGROUND OF THE INVENTION

An administrator might need to relocate a service (e.g., the serving of files) from one server to another server for a variety of reasons. Examples include system upgrade, migration, and consolidation. Unfortunately, it can be difficult to relocate such services in a manner transparent to the users that access those services. For example, if the administrator terminates the service on the first server and starts it on the second server, while users are still making use of the first server, the user's use of the service will be interrupted.

If authentication is required to access the service, the situation can be further complicated. For example, users will typically be required to authenticate themselves to the first server, and then again to the second server, when the service migrates. One technique for avoiding having users provide credentials multiple times is for an intermediary to store the passwords of all users and supply them as needed on behalf of the users whenever needed. Unfortunately, maintaining a list of all users and all passwords can be cumbersome, present security risks, and in some circumstances may not be possible or feasible.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
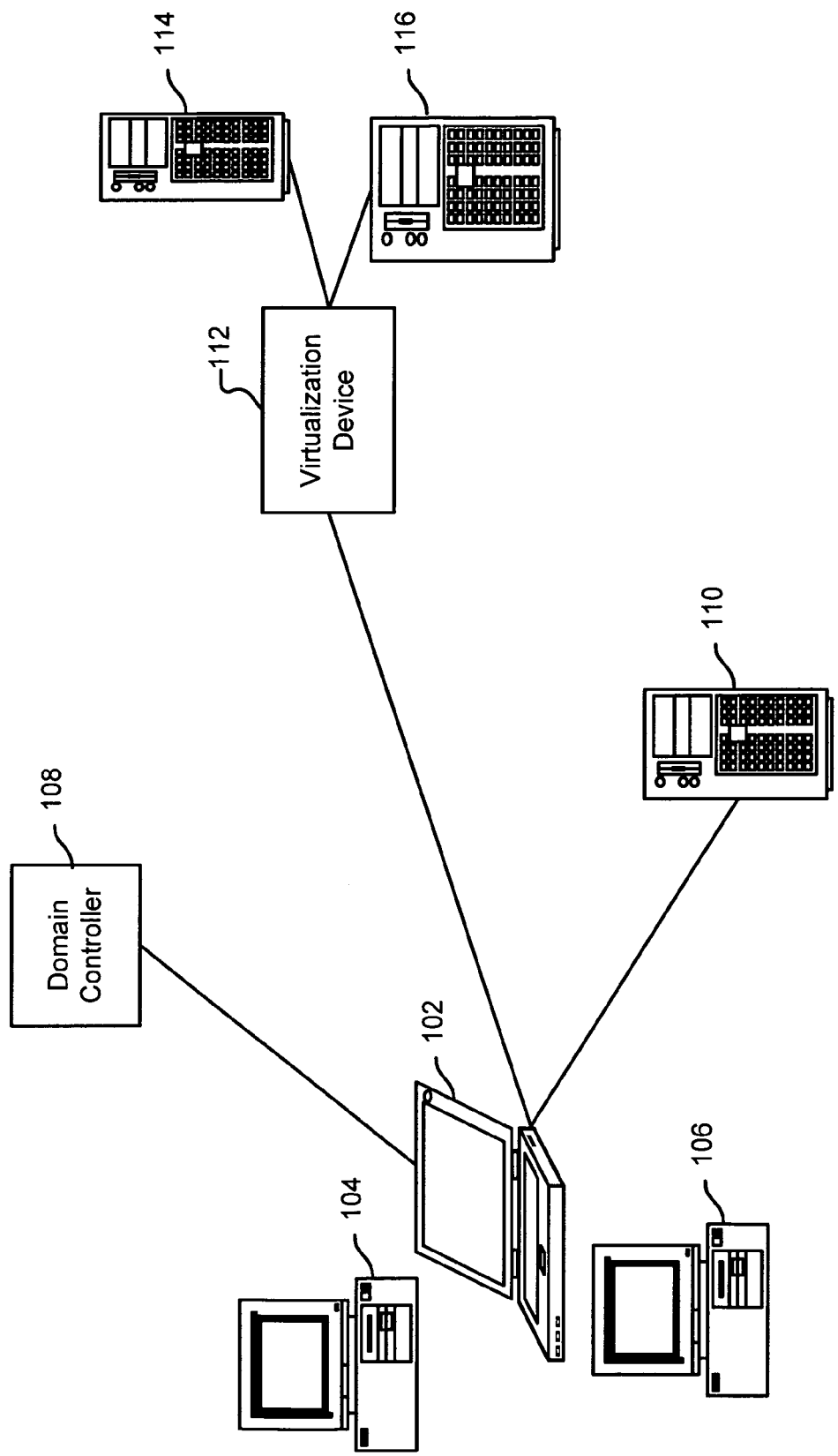
FIG. 1 is a block diagram illustrating an example of an environment providing services to authenticated entities.

FIG. 1 is a block diagram illustrating an example of an environment providing services to authenticated entities. The nodes shown in FIG. 1 may be connected in a variety of ways, such as via a public or private network and/or combination thereof, and may include the Internet, an intranet, LAN, WAN, or other forms of connecting multiple systems and/or groups of systems together.

Clients 102-106 are used to access a variety of services provided by servers such as servers 110, 114, and 116. In order to use a service provided by one of those servers, a user (e.g., using client 102) must be authenticated. In various embodiments, domain controller 108 is configured to receive from clients a request for a Kerberos ticket which can be used by the client to authenticate a user to a server. If the user presents the appropriate username and password, domain controller 108 issues the ticket to client 102.

In some embodiments, domain controller 108 supports the Kerberos protocol and performs the tasks of both an authentication server and a ticket granting server under that protocol. The tickets issued by domain controller 108 are one example of credentials that can be used by a client such as client 102, when authenticating to servers using the techniques described herein. Similarly, the Kerberos keys of servers described herein are one example of secret data associated with those servers that can be leveraged in the server virtualization processes described herein. Other authentication schemes (and their corresponding tokens/credentials) can be used as applicable and the techniques described herein adapted accordingly.

An example of a client such as client 102 is a laptop running Microsoft Windows XP Professional. Clients may also use other operating systems, and additional examples of clients include cellular phones and personal digital assistants, as well as other types of information appliances such as set-top boxes, game consoles, and digital video recorders, as applicable.

In the example described by way of illustration in the following paragraph, server 110 is a print server, server 114 is a NetApp file server, and server 116 is an EMC Celerra file server. Both file servers support the Common Internet File System (CIFS) file sharing protocol; however the techniques described herein may be used with other types of servers/protocols.

If client 102 presents an appropriate ticket (e.g., issued by domain controller 108) and authenticator (also referred to herein collectively as a "startup request") to print server 110, print server 110 will permit client 102 to send print jobs, delete print jobs, configure the print server, etc., commensurate with the privileges associated with the user (e.g., as a member of a basic user group, or an administrator group). In the example shown, server 110 is not virtualized, while servers 114 and 116 are. All three servers support the use of Kerberos for authentication. In an embodiment in which an authentication protocol other than Kerberos is used, client 102 may present authentication data comprising data other than and/or in addition to a Kerberos ticket and authenticator.

Virtualization device 112 is situated between clients 102-106 and servers 114-116. Among other things, virtualization device 112 serves as a bridge, and all client access to services provided by servers 114-116 goes through virtualization device 112. Other servers, such as web servers and mail servers, and/or supporting other protocols may also be virtualized, and the techniques described herein adapted accordingly.

Suppose an administrator would like to migrate a large group of files from file server 114 to file server 116. The administrator does so in some embodiments by instructing virtualization device 112 to initiate the migration. The migration may take several hours. During that time, suppose a user of client 102 needs to access some of those files.

Client 102 contacts domain controller 108 to request a ticket to present to file server 114. Until the files are available on file server 116, virtualization device 112 bridges a connection between client 102 and file server 114, and client 102 authenticates to file server 114 using the issued ticket (and authenticator) accordingly.

When the migration is complete, the administrator would like to take file server 114 offline. Traffic related to file server 114's file sharing service is redirected to file server 116, in some embodiments by implementing a transmit rule.

As described in more detail below, virtualization device 112 possesses a copy of file server 114's secret (e.g., Kerberos) key, as well as file server 116's secret key. Virtualization device 112 is configured to use file server 114's secret key to extract from the ticket/authenticator presented by client 102 information that can be used by virtualization device 112 to generate a new startup request (e.g., a new ticket/authenticator) that will allow server 116 to establish an authenticated session with client 102, without client 102 having to request a new ticket from domain controller 108.

When the transmit rule is in place, if virtualization device 112 receives a request from client 102 to access files on file server 114, virtualization device 112 bridges a connection between client 102 and file server 116, and provides to file server 116 the new startup request (e.g., ticket/authenticator) that it generated using server 116's secret key and the information it extracted from the startup request originally destined for server 114. Client 102 can then access file server 116's file sharing services accordingly. If the responses from server 116 to client 102 are also virtualized, client 102 will be unaware that it is communicating with server 116 instead of server 114, and the virtualization will thus be transparent to client 102. In various embodiments, other techniques are used to intercept traffic between clients and servers. For example, instead of using a level 2 bridge, a level 3 router can be used and the techniques described herein adapted accordingly. In some embodiments full proxying is employed, in which case client 102 connects to virtualization device 112 and virtualization device 112 makes the appropriate server connections.

Figure 2:
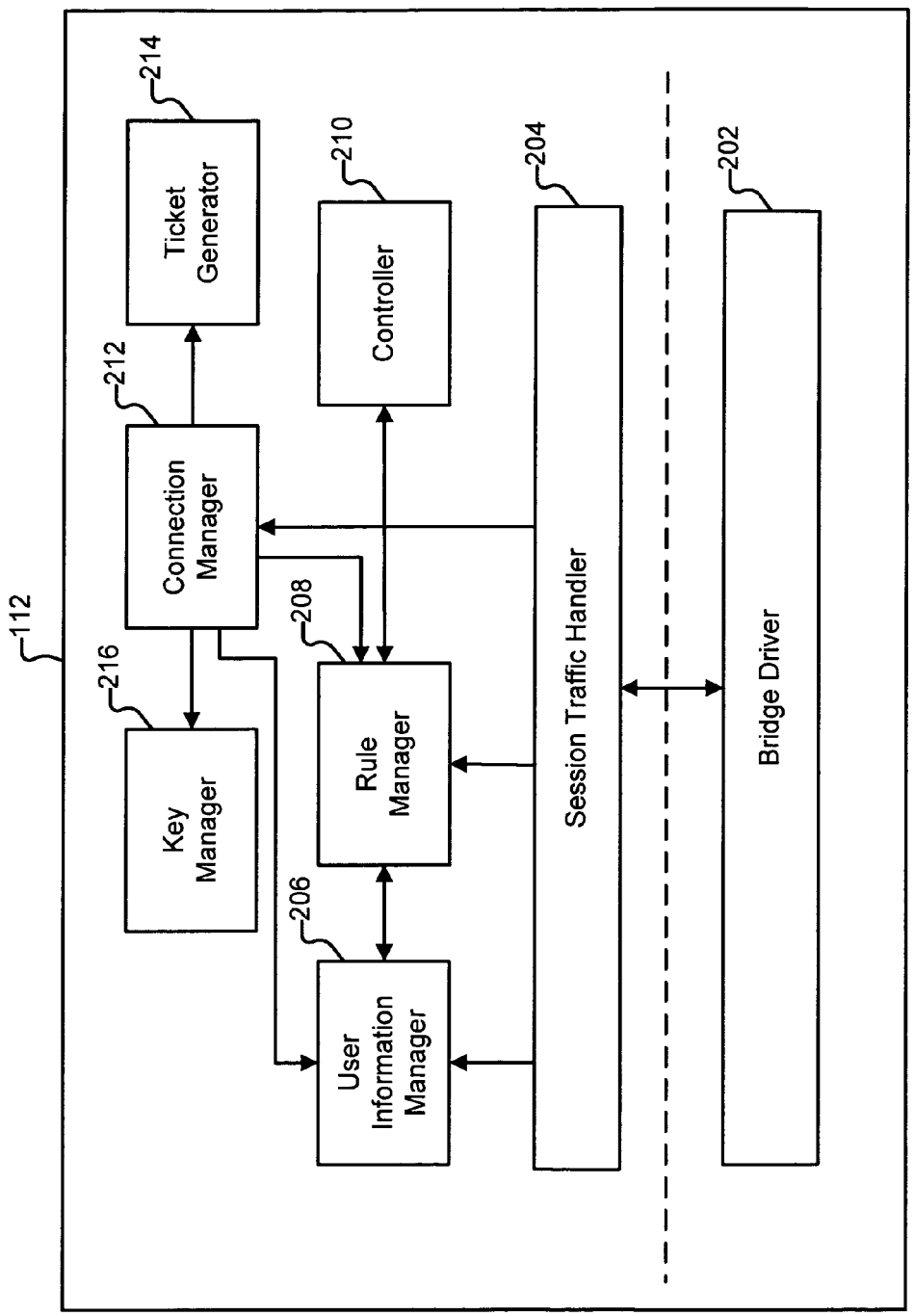
FIG. 2 is a block diagram illustrating an embodiment of a virtualization device.

FIG. 2 is a block diagram illustrating an embodiment of a virtualization device. Bridge driver 202 is used by virtualization device 112 to work as a bridge. It proxies network traffic and sends session relevant packets to the application layer. In some embodiments multiplexed connections are supported, allowing packets from client 102 to be sent to both server 114 and server 116. Bridge driver 202 can also be configured to filter network traffic as applicable.

Session traffic handler 204 manages the session traffic that is passed from the bridge driver 202 and determines the appropriate actions to take, such as extracting a user's group membership information, providing virtualization for the connection, etc.

User information manager 206 provides an interface to store and retrieve a client's information. Examples include extracting the client's Privilege Access Certificate and domain information from the client's ticket/authenticator; extracting and maintaining the client's user group information; adding a client connection to a user information table; retrieving a user's information from the user information table; getting connection keys associated with a specific user; removing a client connection from the user information table; removing a client's user group information; etc. User information manager 206 calls rule manager 208 to determine how to handle specific session traffic.

Rule manager 208 stores and runs transmit rules for virtualizations. An example of a rule is one to redirect to file server 116 requests sent to file server 114. In some embodiments, when it is time to execute such a rule, rule manager 208 calls connection manager 212 to set up new connections to new servers, irrespective of whether setup request traffic has been observed. One reason for this is that the session may have been setup before the rule was run. Rule manager 208 provides a backend to controller 210's frontend.

Controller 210 provides an interface for administrators to control virtualization device 112. For example, an administrator can use controller 210 to migrate services, execute and cancel transmit rules, etc. Controller 210 provides a frontend to rule manager 208.

Connection manager 212 manages all connections seen by bridge driver 202, including the client connection that comes from the client to the virtualization device, as well as the servers' connections to the virtualization device. It includes a connection reset detector (e.g., using a timeout or keep alive messages).

Ticket generator 214 generates new sessions startup requests (e.g., including a new ticket and new authenticator) for use with new servers (i.e., the ones to which a user's services have been migrated) using the client's information and the server's secret key. For example, in the situation in which a user's requests to access files on server 114 are redirected to server 116, ticket generator 214 generates a session startup request for use with server 116.

Key manager 216 receives and caches servers' secret keys. A variety of techniques may be used to collect and maintain the keys. One way is for the server to be configured to provide its key, such as by sending a message to virtualization device 112 at regular time intervals, whenever the key is updated, whenever polled by virtualization device 112, etc. Another way is for an administrator to upload or otherwise inject a server's key, e.g., through an administrative interface. Another way is for key manager 216 to interface with domain controller 108 and obtain the servers' secret keys from the domain controller. In some embodiments if a decryption fails or an attempted setup fails between virtualization device 112 and a server, key manager 216 is configured to obtain a new key from that server. Other techniques can be used to collect and maintain keys as applicable. For example, a tool such as ntdump may be used on the server to dump the server's security key (or on the domain controller, as applicable).

In the example shown in FIG. 2, the components of virtualization device 112 are collocated on a single platform, but portions could be provided across multiple platforms. For example, key manager 216 or portions thereof may be located on a handheld device in communication with, but physically separate from the rest of the components of virtualization device 112. In some embodiments, whenever virtualization device 112 performs a task (such as providing bridging functionality), either a single component or a subset of components or all components of virtualization device 112 may cooperate to perform the task. Similarly, in some embodiments portions of virtualization device 112 are provided by one or more third parties.

Figure 3:
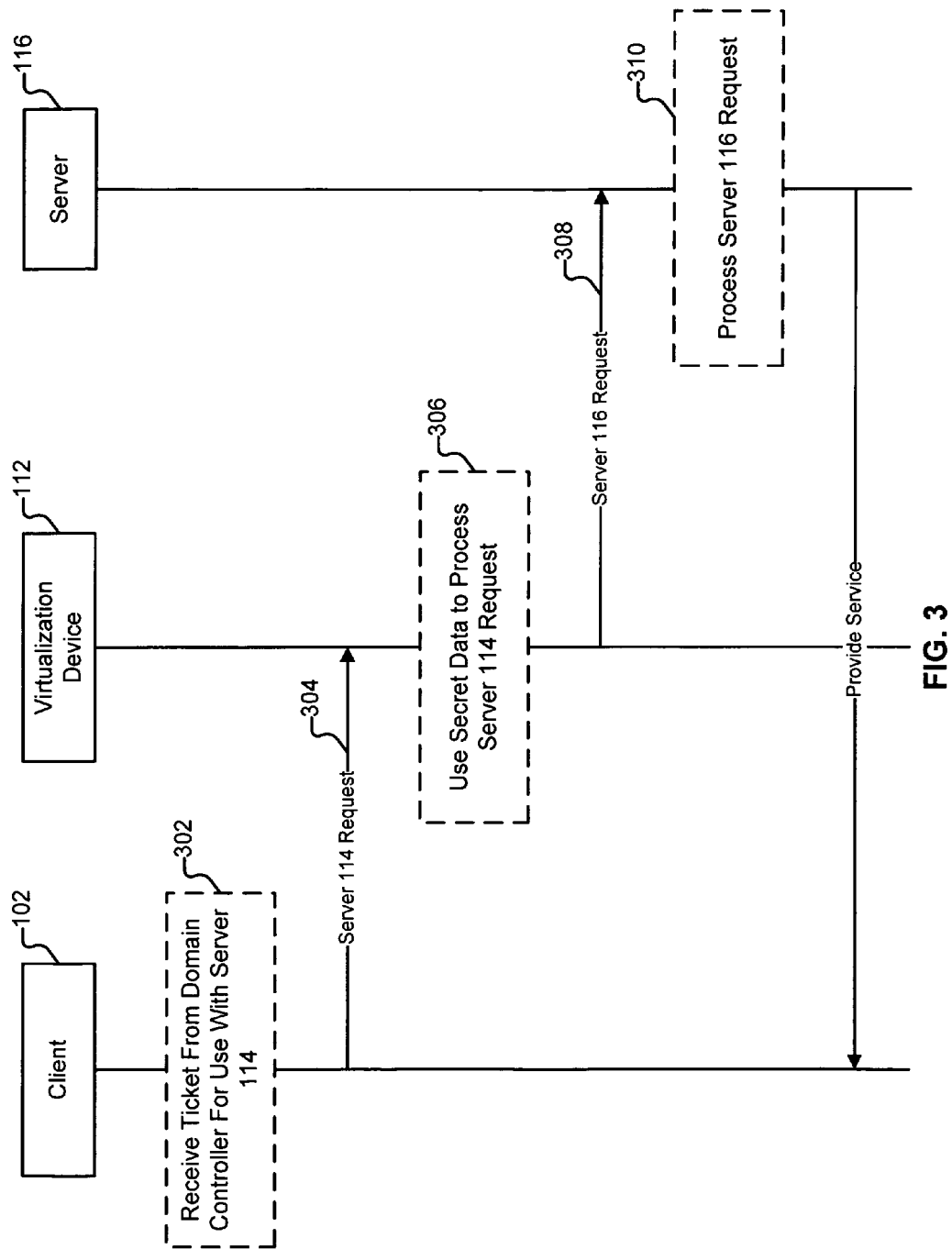
FIG. 3 is a diagram illustrating an embodiment of a process for virtualizing a service.

FIG. 3 is a diagram illustrating an embodiment of a process for virtualizing a service. In the example shown, a user of client 102 wishes to access files stored on file server 114. Access to those files is restricted to authorized users.

The process begins at 302 when client 102 contacts domain controller 108 to obtain a ticket for use with file server 114. Client 102 requests access to file sharing services of server 114 (304), which is received by virtualization device 112. In the example shown, a transmit rule is in place redirecting file sharing service requests aimed at server 114 to server 116. At 306, virtualization device 112 uses secret data (e.g., server 114's Kerberos key) to process the received request, extracting out client 102's user information, etc. Virtualization device 112 uses the extracted information, along with server 116's secret data to create a new request (e.g. including a ticket/authenticator) which is sent to server 116 at 308. At 310, server 116 processes the request and grants access to the files to client 102.

Figure 4:
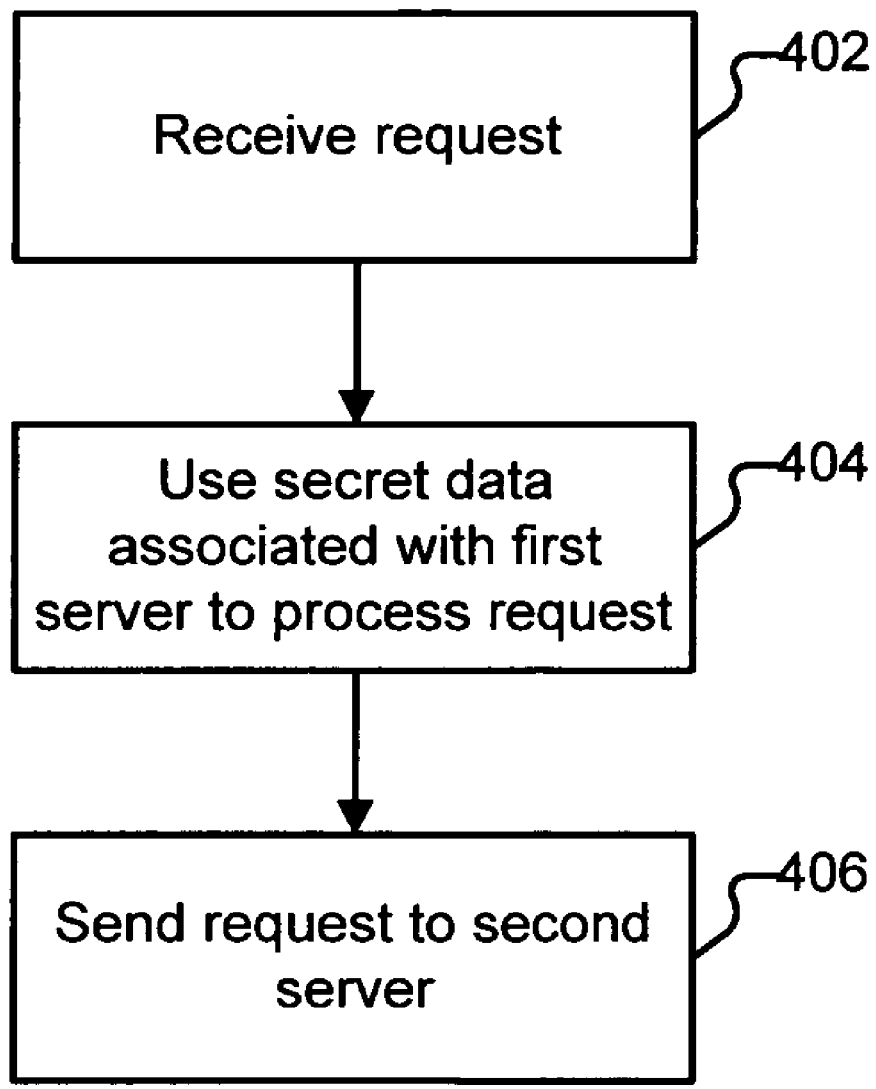
FIG. 4 is a flowchart illustrating an embodiment of a process for virtualizing a service.

FIG. 4 is a flowchart illustrating an embodiment of a process for virtualizing a service. In some embodiments the process shown in FIG. 4 is performed by virtualization device 112. The process begins at 402 when a request is received. For example, when client 102 attempts to connect with file server 114 to access files, a request (e.g., the startup request) is received by virtualization device 112 at 402.

At 404, secret data associated with the server implicated by the request is used to process the request. For example, at 404, file server 114's Kerberos key is used to decrypt the relevant portions of the request and extract out the information necessary to generate a new startup request if/when a new connection request is needed.

At 406, a new request is sent to a new server. For example, if a transmit rule is put in place, at 406, virtualization device 112 uses the information obtained during the processing performed at 404 to generate a new ticket/authenticator that can be used by the new server to authenticate client 102. In some embodiments the request is sent by virtualization device 112 directly. In other cases, (e.g., where the updated ticket/authenticator) are stored with the client, the request is sent by client 102 (and, in some cases) forwarded to server 116 by the bridging functionality of virtualization device 112 at 406.

Figure 5:
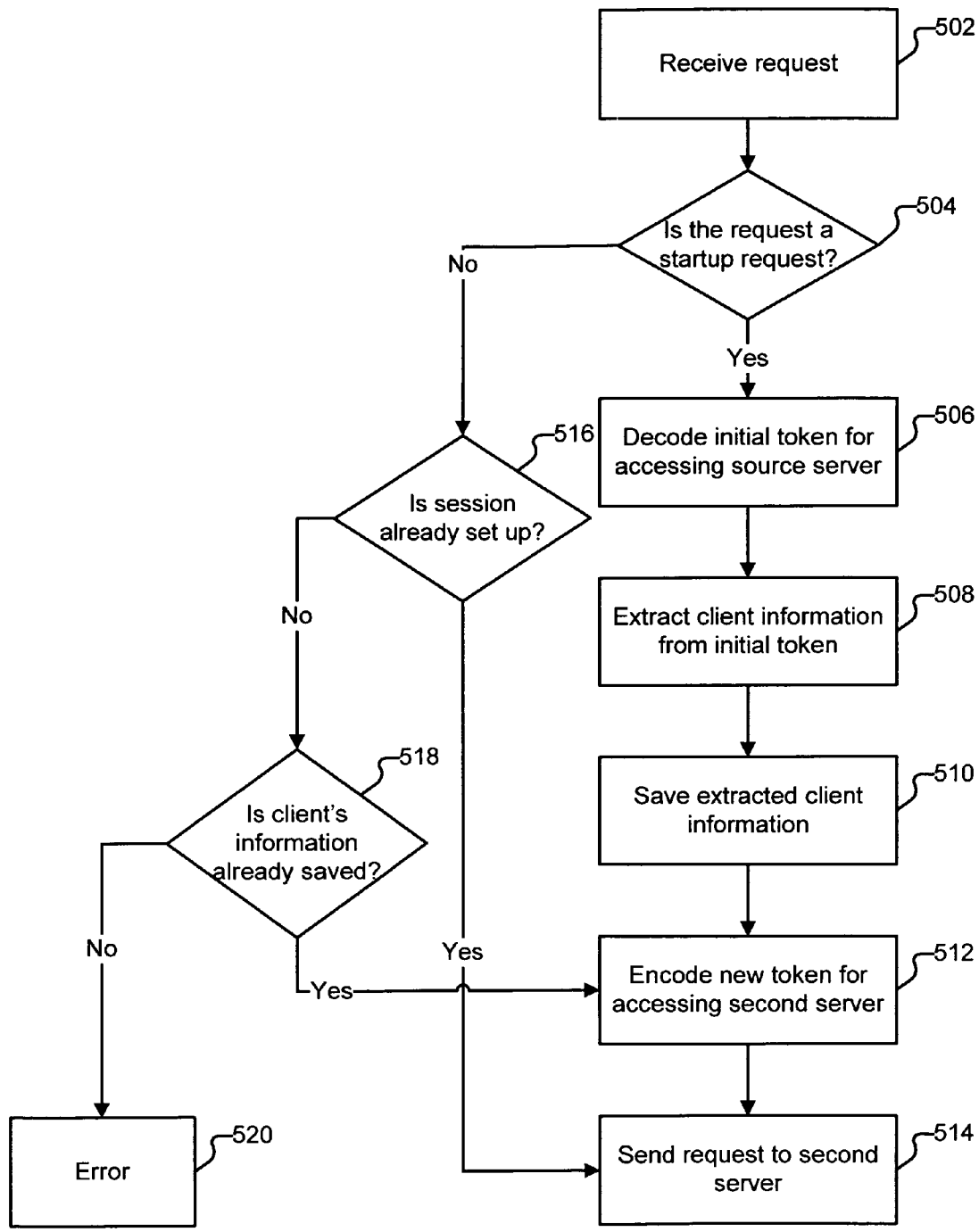
FIG. 5 is a flowchart illustrating an embodiment of a process for virtualizing a service.

FIG. 5 is a flowchart illustrating an embodiment of a process for virtualizing a service. In some embodiments the process shown in FIG. 5 is performed by virtualization device 112. The process begins at 502 when a request is received. At 504 it is determined whether the request received at 402 is a startup request. If the received request is a startup request, an initial token for accessing a server (e.g., server 114) is decoded at 506. At 508, client information is extracted from the token. At 510, the extracted client information is saved. At 512, a new token is encoded for accessing a second server (e.g., server 116). At 514, a request is sent to the second server. If the request received at 402 is not a startup request, at 516 it is determined whether a session has already been set up. If so, a request is sent to the second server at 514. If the session has not already been set up, it is determined at 518 whether the client's information is already saved. If the information has already been saved, at 512 a new token is encoded for accessing the second server. If the client's information has not already been saved, in some embodiments an error is returned.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A service virtualization device, comprising:
   a communication interface configured to receive from a client a first request to access a service provided by a first server, wherein the first request includes a first session ticket; and
   a processor configured to:
   use a secret key associated with the first server to extract information from the first session ticket, and wherein the first session ticket is encrypted with the secret key; and
   send a second request to a second server, wherein the second request includes a second session ticket, and wherein the second session ticket is based at least in part on the information extracted from the first session ticket;
   wherein the first and second servers are associated with a virtualization; and wherein the second server establishes an authenticated session with the client in response to the second server receiving the second request, including the second session ticket sent, by the service virtualization device.

2. The service virtualization device of claim 1 wherein the secret key associated with the first server is received from the first server.

3. The service virtualization device of claim 1 wherein the secret key associated with the first server is provided to the service virtualization device by an administrator or other authorized user.

4. The service virtualization device of claim 1 wherein the secret key associated with the first server includes a key generated as part of the Kerberos protocol.

5. The service virtualization device of claim 1, wherein the processor is further configured to use the secret key associated with the first server to decrypt at least a portion of the received first request.

6. The service virtualization device of claim 1 wherein at least a portion of the second request is encrypted with a secret key associated with the second server.

7. The service virtualization device of claim 1 wherein the processor is further configured to bridge communications between the client and the first server.

8. The service virtualization device of claim 1 wherein the processor is further configured to bridge communications between the client and the second server.

9. The service virtualization device of claim 1 wherein the processor is further configured to redirect traffic related to the service from the first server to the second server.

10. The service virtualization device of claim 1 wherein the processor is further configured to initiate redirection of traffic related to the service from the first server to the second server.

11. The service virtualization device of claim 1 wherein the processor is further configured to manage relocation from the first server to the second server of one or more of the service and a resource accessible via the service.

12. A method for virtualizing a service including:
   receiving from a client a first request to access a service provided by a first server, wherein the first request includes a first session ticket;
   using a secret key associated with the first server to extract information from the first session ticket with a processor, and wherein the first session ticket is encrypted with the secret key; and
   sending a second request to a second server, wherein the second request includes a second session ticket, and wherein the second session ticket is based at least in part on the information extracted from the first session ticket;
   wherein the first and second servers are associated with a virtualization; and wherein the second server establishes an authenticated session with the client in response to the second server receiving the second request that includes the second session ticket.

13. The method of claim 12 wherein the secret key associated with the first server includes a key generated as part of the Kerberos protocol.

14. The method of claim 12, further comprising using the secret key associated with the first server to decrypt at least a portion of the received first request.

15. The method of claim 12 further comprising managing relocation from the first server to the second server of one or more of the service and a resource accessible via the service.

16. A computer program product for virtualizing a service, the computer program product being embodied in a non-transitory computer readable storage medium and comprising computer instructions for:

receiving from a client a first request to access a service provided by a first server, wherein the first request includes a first session ticket;

using a secret key associated with the first server to extract information from the first session ticket, and wherein the first session ticket is encrypted with the secret key; and sending a second request to a second server, wherein the second request includes a second session ticket, and wherein the second session ticket is based at least in part on the information extracted from the first session ticket;

wherein the first and second servers are associated with a virtualization; and wherein the second server establishes an authenticated session with the client in response to the second server receiving the second request that includes the second session ticket.

\* \* \* \* \*